US007265859B2

(12) United States Patent
Sato

(10) Patent No.: US 7,265,859 B2
(45) Date of Patent: Sep. 4, 2007

(54) IMAGE PROCESSING APPARATUS AND CONTROL METHOD THEREOF

(75) Inventor: Tomoya Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 10/059,146

(22) Filed: Jan. 31, 2002

(65) Prior Publication Data
US 2002/0105677 A1 Aug. 8, 2002

(30) Foreign Application Priority Data
Feb. 7, 2001 (JP) ............................ 2001-030371

(51) Int. Cl.
*G06F 15/00* (2006.01)
(52) U.S. Cl. ..................................... 358/1.15; 358/405
(58) Field of Classification Search ............... 358/1.12, 358/1.14, 1.15, 400, 405, 407
See application file for complete search history.

(56) References Cited

U.S. PATENT DOCUMENTS 6,456,400 B1 * 9/2002 Ikegami et al. ............. 358/434
6,701,384 B1 * 3/2004 Fukuta ........................... 710/5

FOREIGN PATENT DOCUMENTS

JP 10-207661 A 8/1998
JP 2000-123030 A 4/2000

OTHER PUBLICATIONS

Japanese Office Action, issued Sep. 1, 2006 for corresponding Japanese application No. 2001-029621 which is relative to the priority application No. 2001-030371 of the present application.

* cited by examiner

*Primary Examiner*—Kimberly A. Williams
(74) *Attorney, Agent, or Firm*—Fitzpatrick, Cella, Harper & Scinto

(57) ABSTRACT

An image processing apparatus comprises a connector to connect the apparatus to a network to which plural client terminals are connectable, an acceptor to accept a request from one client terminal, a processor to perform a process regarding the image data according to the accepted request, a registering unit to register the content of the performed process, a discriminator to discriminate, when the request is accepted, whether or not the content of the process according to the request has been registered, and a determinator to determine the process content when the request is accepted according to a discriminator's request. Thus, when the respective functions of the image processing apparatus are used from the client terminals, it is possible to increase operability and simplify user administration by making a display screen different and by limiting the function for each terminal.

9 Claims, 17 Drawing Sheets

| CLIENT DISCRIMINATION ID | BOX NO. | ADDRESS BOOK NO. |
|---|---|---|
| 20000810102345 | 0 | 4 |
| 20000811122333 | 5 | 5 |
| 19990506165505 | 6 | — |
| | | |
| | | |
| | | |
| | | |

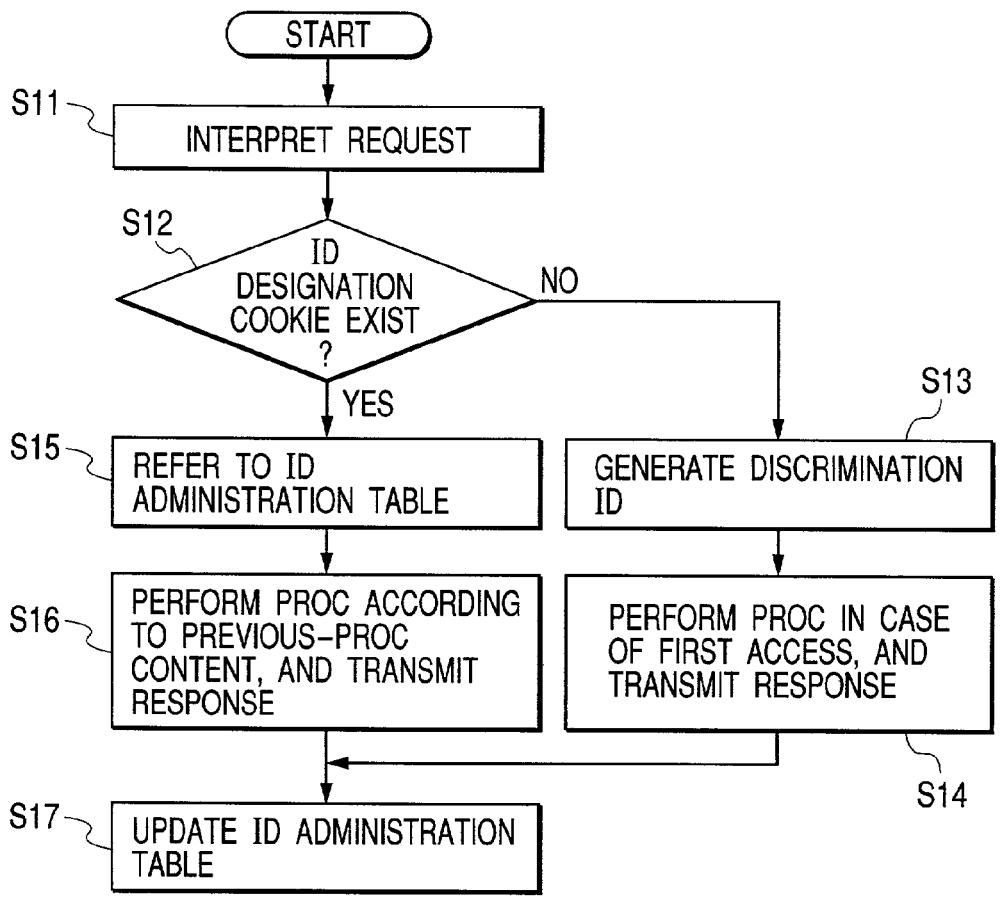

FIG. 15

| CLIENT ID | USER NAME | AUTHORITY | LIMITED NUMBER OF FACES | OUTPUT NUMBER OF FACES | COLOR OUTPUT |
|---|---|---|---|---|---|
| 20000810102345 | ADMIN | ADMINISTRATOR ▼ | 99999 | 111 | ☑ |
| 20000811122333 | TOMOYA | PRINT PERMISSION ▼ | 500 | 5 | ☑ |
| 19990506165505 | TARO | PRINT PERMISSION ▼ | 500 | 200 | ☐ |
| 20011126222324 | JIRO | PRINT INHIBITION ▼ | 500 | 300 | ☑ |
| 20011112222345 | NEW USER | REGISTRATION WAITING ▼ | 0 | 0 | ☐ |

USER ADMINISTRATION

[REGISTRATION]

DOCUMENT COMPLETION

FIG. 19

```
○ DP REMOTE UI:DSF-NETSCAPE                        _ □ ×
FILE(F)  EDIT(E)  DISPLAY(V)  JUMP(G)  COMMUNICATOR(C)  HELP(H)
```

PRINT SETTING

PRINT START

NUMBER OF COPIES:   |1|  (1~256)  ⌇―192

SHEET SELECTION:    |A4       ▼|

SORTER:             |SORT     ▼|
                    ☐ SHIFT

☐ PERFORM COLOR OUTPUT  ⌇―191

|DOCUMENT COMPLETION|

IMAGE PROCESSING APPARATUS AND CONTROL METHOD THEREOF

BACKGROUND OF THE INVENTION

1. Field of the Invention

The present invention relates to an image processing apparatus which can be connected to a network, and a control method of the image processing apparatus.

2. Related Background Art

Conventionally, it has been known that an image processing apparatus such as a copying machine, a facsimile machine or the like is connected to a network such as the Internet or the like, and the image processing apparatus can be operated on the basis of an instruction issued and sent from a computer terminal on the network.

In this case, a driver dedicated for the image processing apparatus being the operation target has been previously installed in the computer terminal, and the instruction issued and sent from the computer terminal side is transmitted to this image processing apparatus through the driver so as to cause it to perform a desired operation.

Further, it has been recently developed a system that a Web server function is given to an image processing apparatus, whereby a computer terminal side can issue and send an instruction to the image processing apparatus by using general Web browser software (simply called Web browser hereinafter) to be able to operate the image processing apparatus.

In this case, it is sufficient for the computer terminal side to only use the general-purpose Web browser, whereby the computer terminal can operate the image processing apparatus even if this terminal does not have any dedicated driver.

Further, it has been recently known an image processing apparatus in which, for example, an area (called a box hereinafter) dedicated for each user is provided in a large-capacity hard disk drive or the like, whereby image data obtained by reading an original image with a scanner, image data received by facsimile, image data received through the network and the like can be stored in the area (box). In such the image processing apparatus, convenience in use is improved by preparing a lot of boxes. However, if a user tries to refer to the contents of the box from the computer terminal on the network, he must output a list of all the boxes every time and then select his own box included in the list.

For this reason, according as the number of the boxes increases, it becomes difficult for the user to search for his own box from among them.

Further, in a case where an image processing apparatus having a transmission function such as a facsimile transmission function, an electronic mail transmission function or the like is operated from the computer terminal on the network, an operation to fetch an address book registered in the body of the image processing apparatus and then select a desired address described in the fetched address book is performed.

In this case, although the address that a user uses is often a specific (i.e., limited) address, it takes a much time for this user to search for in the address book such the address that he always uses from among all the addresses shared by all the users of the image processing apparatus.

SUMMARY OF THE INVENTION

An object of the present invention is to provide an image processing apparatus which eliminates such conventional problems as above, and a control method for this image processing apparatus.

Another object of the present invention is to provide an image processing apparatus which can provide an operation screen according to a user who uses this apparatus, and a control method for this image processing apparatus.

Still another object of the present invention is to provide an image processing apparatus which can provide an operation screen according to the past operation contents of a user who uses this apparatus, and a control method for this image processing apparatus.

Still another object of the present invention is to provide an image processing apparatus which can restrict usable functions according to a user who uses this apparatus, and a control method for this image processing apparatus.

The above and other objects of the present invention will become apparent from the following detailed description based on the attached drawings.

BRIEF DESCRIPTION OF THE DRAWINGS

FIG. 10 is a flow chart showing an operation in a case where a Web client accesses an image processing apparatus by using Web browser, in the second embodiment;

FIG. 11 is a diagram showing a client ID administration table according to the third embodiment;

FIG. 15 is an illustration showing a screen displayed in a case where a Web client of authority "administrator" in the client ID administration table depresses a user administration button, in the third embodiment;

FIG. 19 is an illustration showing a print setting screen in the third embodiment.

DETAILED DESCRIPTION OF THE PREFERRED EMBODIMENTS

Hereinafter, the embodiments of the present invention will be explained in detail with reference to the attached drawings.

First Embodiment

Figure 1:
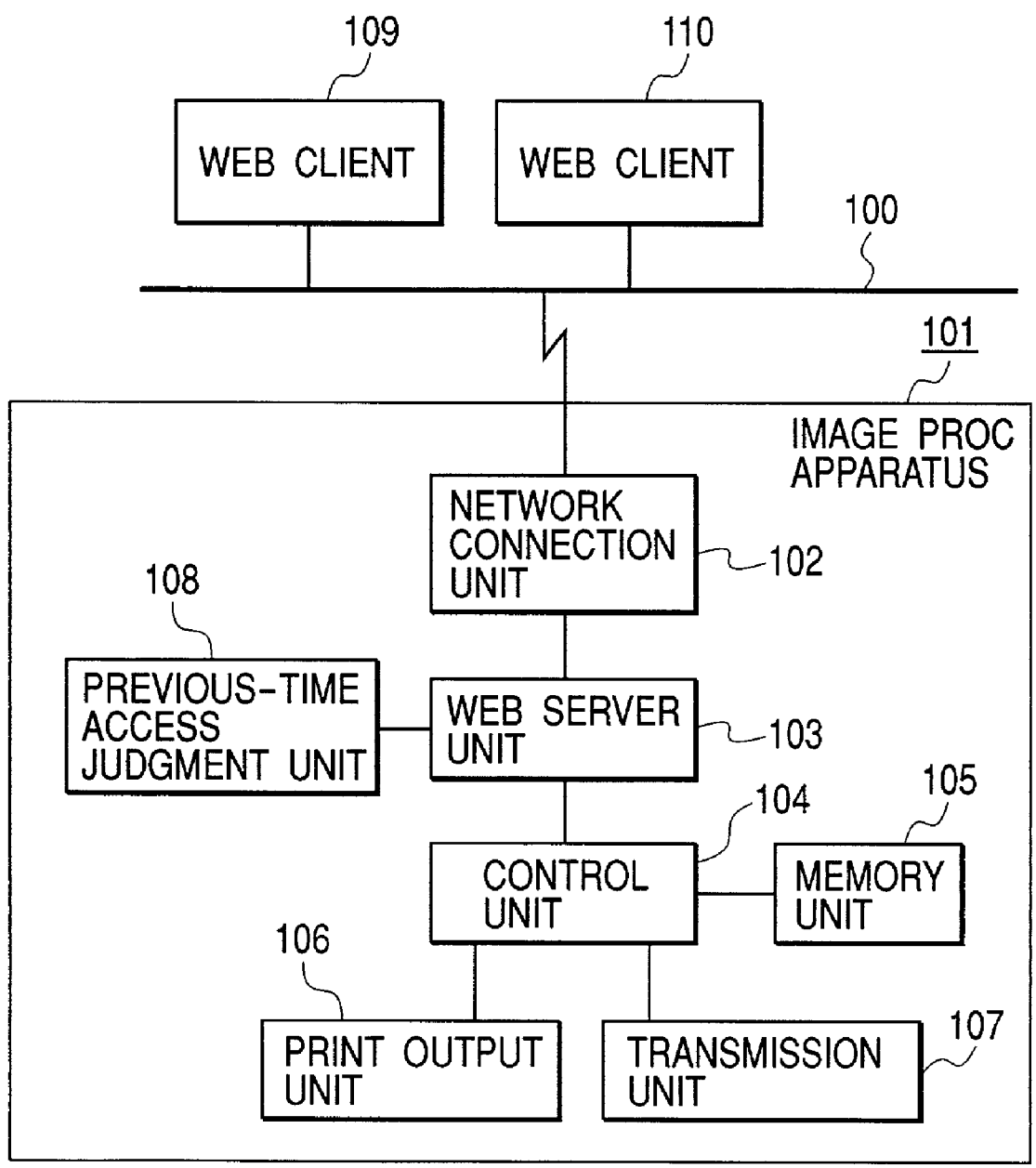
FIG. 1 is a block diagram showing the structure of a system including an image processing apparatus according to the first embodiment of the present invention.

FIG. 1 is a block diagram showing the structure of a system including an image processing apparatus 101 according to the first embodiment of the present invention.

The image processing apparatus 101 can communicate with Web client terminals (simply called Web clients hereinafter) 109 and 110 through a network 100.

The image processing apparatus 101 includes a network connection unit 102, a Web server unit 103, a control unit 104, a memory unit 105, a print output unit 106, a transmission unit 107, and a previous-time access judgment unit 108. It should be noted that the image processing apparatus 101 may contain either one of the print output unit 106 and the transmission unit 107.

Further, the network connection unit 102 transmit and receive (or accept) data through the network 100. The network 100 may apply any form such as a public switched network, a dedicated line or the like if it can connect with the Internet.

The Web server unit 103 is the server which can perform communication according to HTTP (HyperText Transport Protocol) operates according to requests from the Web clients 109 and 110. The Web server unit 103 can convert various information administrated and managed by the image processing apparatus 101 into data for a Web page (so called a home page), i.e., data of HTML (HyperText Markup Language) format, and hold the obtained data of HTML format. Then, the Web server unit 103 accepts the instructions from the Web clients 109 and 110 by using Web browser, and thus transmits the corresponding data of HTML format. The Web browser used by the Web clients 109 and 110 may be general Web browser, and the Web clients 109 and 110 issue and send various instructions to the image processing apparatus 101 by using the Web browser installed in a computer terminal. Incidentally, the number of the Web clients is not limited to two, that is, more clients can be connected on the network 100.

The control unit 104 control the entire operation of the image processing apparatus 101. That is, the control unit 104 controls the print output unit 106 to print and the transmission unit 107 to transmit the part of the data stored in the memory unit 105 on the basis of a request from the Web server unit 103.

The previous-time access judgment unit 108 judges whether or not the request received (or accepted) by the Web server unit 103 is the request which is sent from the Web browser of the Web client which has accessed the image processing apparatus 101 in the past. If it is judged that the request received by the Web server unit 103 is the request sent from the Web client once accessed the image processing apparatus 101, the previous-time access judgment unit 108 informs the Web server unit 103 of the previously accessed contents, whereby the operation of the Web server unit 103 is changed according to the notified contents.

Figure 2:
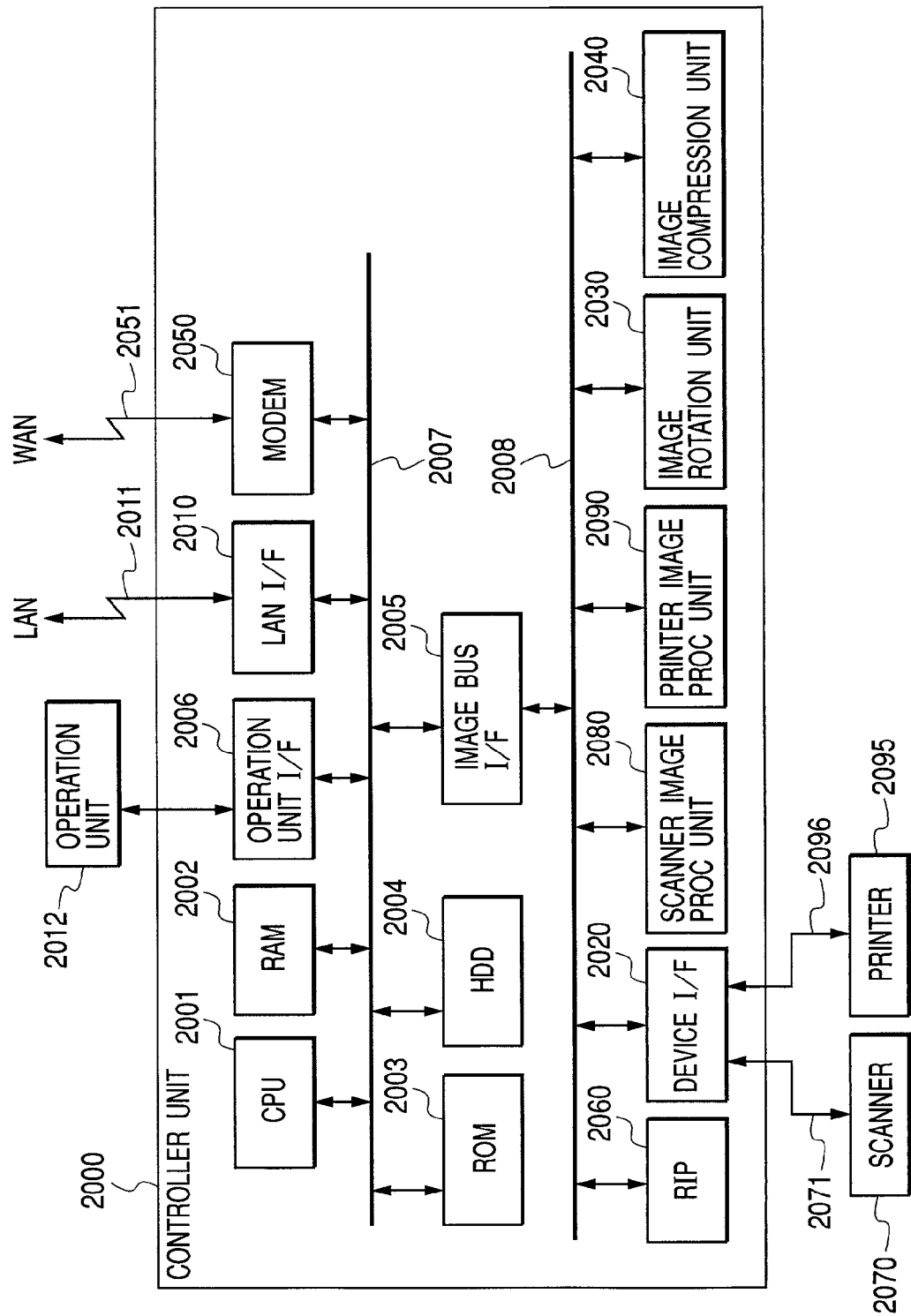
FIG. 2 is a block diagram showing the structure of a controller unit of the image processing apparatus.

FIG. 2 is a block diagram showing the structure of a controller unit 2000 of the image processing apparatus 101. The controller unit 2000 includes the components corresponding to the network connection unit 102, the Web server unit 103, the control unit 104, the memory unit 105, the print output unit 106, the transmission unit 107 and the previous-time access judgment unit 108 respectively shown in FIG. 1.

A scanner 2070 functioning as an image input device and a printer 2095 functioning as an image output device are respectively connected to the controller unit 2000, and also a LAN (local area network) 2011 and a public line (or a WAN (wide area network)) 2051 are respectively connected to the controller unit 2000. The controller unit 2000 acts as a multifunctional apparatus which has a copying function, a print function for printing and outputting data externally supplied through the LAN 2011, and a communication function including a facsimile function through the WAN 2051, and the like. It should be noted that, in FIG. 2, the printer 2095 corresponds to the print output unit 106 of FIG. 1, and the LAN 2011 and the WAN 2051 correspond to the network 100 of FIG. 1.

The controller unit 2000 includes a CPU (central processing unit) 2001 which starts the system on the basis of a boot program stored in a ROM (read-only memory) 2003, reads various control programs stored in an HDD (hard disk drive) 2004 (corresponding to the memory unit 205 of FIG. 1), and performs predetermined processes by using a RAM (random-access memory) 2002 as a working area. Here, the above various programs and image data are stored in the HDD 2004. Flow charts described later indicate the flow of the operation which is controlled by the CPU 2001 on the basis of the programs stored in the HDD 2004.

The RAM 2002, the ROM 2003, the HDD 2004, an operation unit I/F (interface) 2006, a LAN I/F 2010, a modem 2050, and an image bus I/F 2005 are connected to the CPU 2001 through a system bus 2007. Here, it should be noted that, in FIG. 2, the LAN I/F 2010 and the modem 2050 correspond to the network connection unit 102 of FIG. 1.

The operation unit I/F 2006 which is the interface between the controller unit 2000 and an operation unit 2012 transfers the image data to the operation unit 2012 to be displayed thereon, and also transfers a signal generated by input operations on the operation unit 2012 to the CPU 2001.

The operation unit 2012 includes a display unit and an input unit. The display unit displays, e.g., an information input screen which is used to input a current setting status of each function concerning the image process, and setting information for each function. The input unit includes various keys and the like which are used to input the setting information for each function. The detailed structure of the operation unit 2012 will be described later.

The LAN I/F 2010 which is connected to the LAN 2011 inputs and outputs information through the LAN 2011, and the modem 2050 which is connected to the WAN 2051 inputs and outputs information through the WAN 2051. The image bus I/F 2005 which connects an image bus 2008 and the system bus 2007 to each other consists of a bus bridge for converting and changing a data structure. The image bus 2008 consists of a PCI (Peripheral Component Interconnect)

bus capable of transferring image data at high speed or a bus according to an IEEE1394 (Institute of Electrical and Electronic Engineers 1394) standard.

An RIP (raster image processor) 2060, a device I/F 2020, a scanner image processing unit 2080, a printer image processing unit 2090, an image rotation unit 2030, and an image compression unit 2040 are connected to the image bus 2008.

The RIP 2060 expands (or decompresses) a PDL (page description language) code into a bit map image. The device I/F 2020 which connects the scanner 2070 and the printer 2095 respectively functioning as the image input and output devices and the controller unit 2000 to others performs synchronous/asynchronous conversion of image data. In this case, the device I/F 2020 and the scanner 2070 are connected to each other through a cable 2071, and the device I/F 2020 and the printer 2095 are connected to each other through a cable 2096.

The scanner image processing unit 2080 performs correction, a process and editing of input image data, the printer image processing unit 2090 performs correction, resolution conversion and the like of print output image data, and the image rotation unit 2030 performs a rotation process of image data. The image compression unit 2040 performs compression and decompression processes of multivalue image data according to a JPEG (Joint Photographic Experts Group) format, and performs compression and decompression processes of binary image data according to a JBIG (Joint Bi-level Image experts Group) format, an MMR (Modified Modified READ (Relative Element Address Designate)) format or a MH (Modified Huffman) format.

As above, the CPU 2001 of the controller unit 2000 entirely controls access of the various devices connected to the system bus 2007 on the basis of the corresponding control programs. Further, the CPU 2001 performs control to read image information from the scanner 2070 through the device I/F 2020, perform a predetermined process to the read image information, and then output the processed image information to the printer 2095 through the device I/F 2020.

Figure 3:
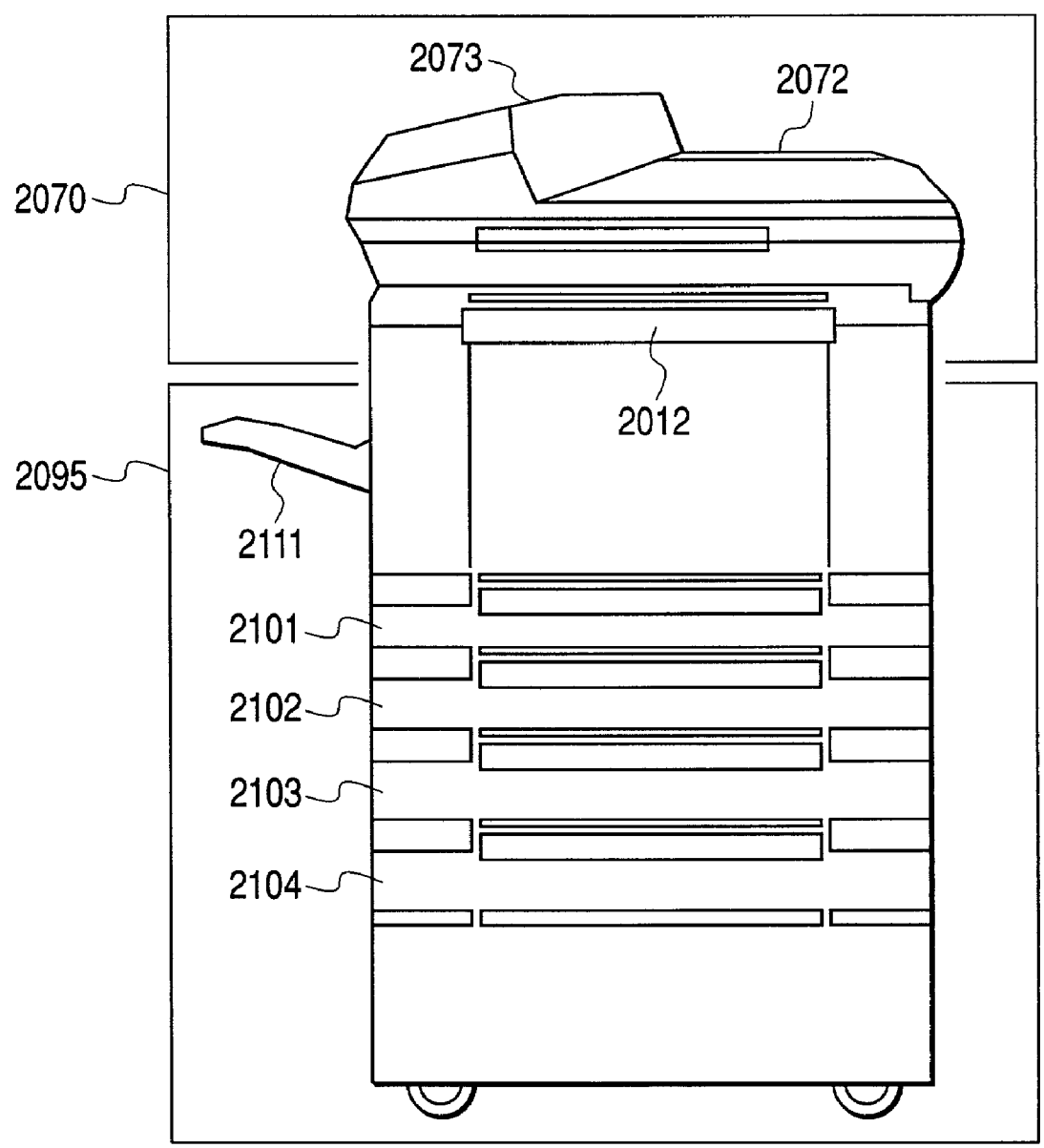
FIG. 3 is an apparent diagram showing the body of the image processing apparatus.

FIG. 3 is an apparent diagram showing the body of the image processing apparatus 101.

As shown in FIG. 3, the scanner 2070 functioning as the image input device and the printer 2095 functioning as the image output device are integrally structured as an image input/output device, and the operation unit 2012 is provided on the scanner 2070.

The scanner 2070 illuminates an image on a set original, causes a CCD (charge-coupled device) line sensor (not shown) to scan the illuminated image, and thus reads the image on the original. Then, the read image is converted into raster image data by photoelectric conversion. If the original is set on a tray 2073 of an original feeder 2072 and a reading start instruction is issued by a user from the operation unit 2012, the CPU 2001 of the controller unit 2000 instructs the scanner 2070 to read the original. By such the instruction of the CPU 2001, the original is fed one by one from the original feeder 2072, and the original image is read for each of the fed originals.

The printer 2095 performs an image process to convert the raster image data transferred from the device I/F 2020 through the cable 2096, into an image to be actually formed on a sheet. As an image processing system for the printer 2095, an electrophotographic system to perform laser-beam scan based on the raster image data on an electrostatic latent image bearing body such as a photosensitive drum, a photosensitive belt or the like and thus form an electrostatic latent image is used.

It should be noted that although the electro-photographic system is used in the present embodiment, another image recording system such as an inkjet system to emit ink from a micronozzle array and thus directly print an image on a sheet may be used.

A print operation is started on the basis of an instruction from the CPU 2001 in the controller unit 2000. The printer 2095 includes plural kinds of sheet feed cassettes so that the user can select various sheet sizes and various sheet directions. Thus, sheet cassettes 2101, 2102, 2103 and 2104 on which sheets of various sizes and directions can be respectively set are provided. The sheet on which an image was formed is discharged to a sheet discharge tray 2111.

Next, the structure of the operation unit 2012 will be explained.

Figure 4:
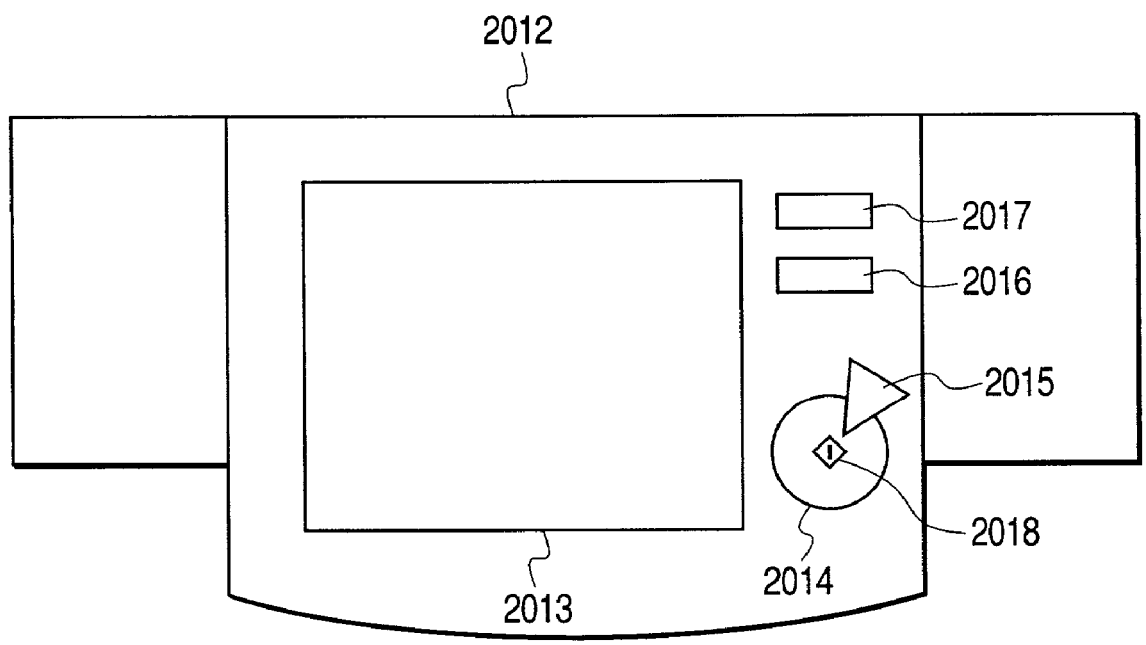
FIG. 4 is an apparent diagram showing an operation unit of the image processing apparatus.

FIG. 4 is an upper apparent diagram showing the operation unit 2012.

The operation unit 2012 includes an LCD (liquid crystal display) 2013 on which a touch panel sheet has been adhered to a screen, and plural hard keys. An operation screen of the system and soft keys are displayed on the LCD 2013. If the displayed soft key is depressed, positional information corresponding to the depressed soft key is output to the CPU 2001 of the controller unit 2000 through the operation unit I/F 2006. A start key 2014, a stop key 2015, an ID key 2016 and a reset key 2017 are provided as the hard keys.

The start key 2014 is depressed to instruct a start of a reading operation of the original image, and a two-color (red and green) LED (light-emitting diode) 2018 is disposed at the central portion of the start key 2014. If the two-color LED 2018 lights red, it represents that the depression of the start key 2014 is not accepted, while if the two-color LED 2018 lights green, it represents that the depression of the start key 2014 is accepted. The stop key 2015 is depressed to stop the operation under execution, the ID key 2016 is depressed to input a user's ID, and the reset key 2017 is depressed to initialize or reset the setting performed by the user on the operation unit 2012.

Next, a box function will be explained.

In the HDD 2004, plural areas (called "boxes" hereinafter) each of which temporarily stores image data are prepared, and these boxes are classified into a group of user boxes and a group of system boxes. A document which is obtained when the original image is read with use of the scanner 2070 by the user, and data which is distinguished for each user (e.g., the data sent from the computer terminal through the network 100) are stored in the user box. On the other hand, data undistinguished for each user (e.g., a facsimile document received without setting any condition to distinguish each user) is stored in the system box. A specific number is added to each user box so that the respective boxes are distinguishable from others.

Further, on a not-shown screen, a box name, a PIN (personal identification number) code, a time necessary to automatically delete the stored data from the box can be set in the user box.

The user can instruct and cause the controller unit to store the scanned image, the image sent from the computer, and the like in the box. The stored document can be transmitted by facsimile, an electronic mail and the like, moved from one box to another box, and printed out.

Next, a remote UI (user interface) function will be explained.

In the remote UI function, various information in the image processing apparatus 101 is converted into data of HTML format, and such the obtained HTML data is displayed by using the Web browser from the Web client connected on the network 100, or the obtained HTML data is processed according to an instruction received by using the Web browser from the Web client connected on the network 100. That is, according to the remote UI function, the operation which is equivalent to the operation capable of being directly performed on the operation unit 2012 of the image processing apparatus 101 can be remotely performed from the Web client.

On the screen displayed by the remote UI function, the image being the base of display is generated by the Web server unit 103 of the image processing apparatus 101 (i.e., the operation of the CPU 2001 based on the program stored in the HDD 2004) and then actually displayed based on the Web browser installed in the Web client.

In case of using the remote UI function, first, when the image processing apparatus 101 is accessed from the Web client on the network, the user directly inputs a URL (Uniform Resource Locator) to an address section of the Web browser to access the image processing apparatus 101 or the user selects by using a mouse or the like a link to which the URL has been embedded. For example, the URL is given as "http://aaa.bbb.ccc.ddd/", that is, an IP (Internet Protocol) address of the image processing apparatus 101 is designated next to "http://". Thus, the Web browser transmits an HTTP command to designate the URL through the network 100. The Web server unit 103 of the image processing apparatus 101 receives the HTTP command, analyze the received command, and then performs the operation according to the analyzed command.

If the request from the Web browser is an operation request to the image processing apparatus 101, a process of a corresponding CGI (Common Gateway Interface) program is performed, whereby obtainment and setting of device information and operations such as print output and the like are performed. A value which is input to a form or the like by the user and thus designated from the Web browser is sent from the Web server unit to the CGI program and thus used as a control parameter or the like.

Figure 5:
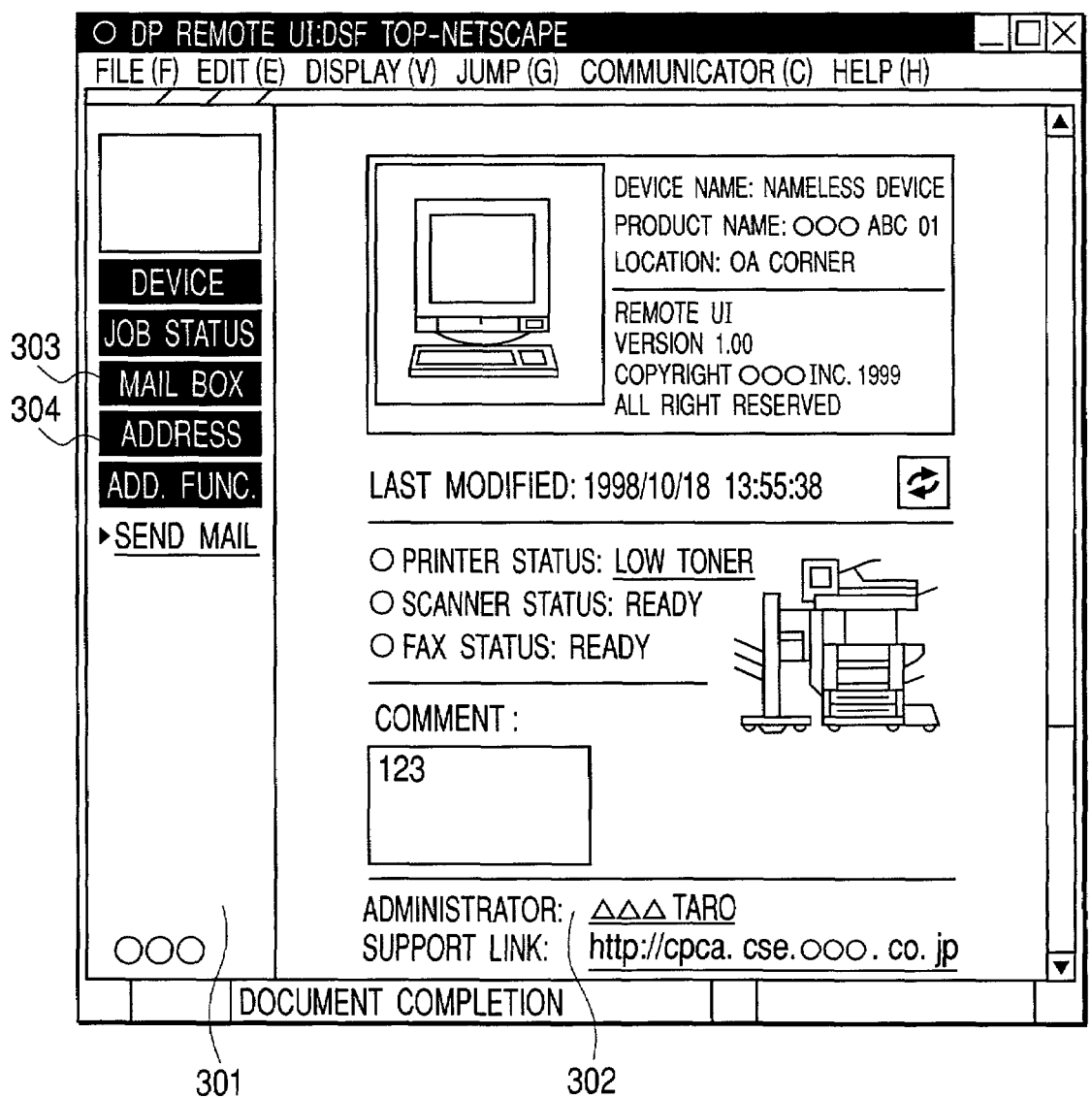
FIG. 5 is an illustration showing a screen displayed first on the basis of Web browser.

FIG. 5 is an illustration showing a screen displayed as the top page of a remote UI on the Web browser.

The top page of the remote UI is the page which is first displayed when the URL of the image processing apparatus 101 is input to the section on the Web browser. As shown in FIG. 5, the screen (i.e., the top page) consists of two frames of an index area 301 and a main area 302. A map of main sites is displayed in the index area 301, and if an appropriate button on the map is depressed, the screen corresponding to the depressed button is displayed in the main area 302.

In the present embodiment, a cookie function is used to judge, based on a request from a Web client, whether or not there was the request from the same Web client in the past.

The cookie function is the function by which the Web server unit which communicates with the Web client according to HTTP instructs this client to hold and maintain the information on this client's side, and the information to be held and maintained here is called "cookie".

In order to set the cookie, the Web server unit adds a so-called set-cookie header written by a format "Set-Cookie: name=value", to a response to the Web client. If the Web client receives such information, this client stores the content "name=value" together with the URL range where this content becomes effective.

Hereinafter, in case of referring to the same location, the Web client in question adds the header "Cookie: name=value" to the HTTP request and then transmits this request. If the Web server unit receives the HTTP request to which the header "Cookie: name=value" has been added, the previous-time access judgment unit 108 refers to the content written in this header and thus instructs the Web server unit 103 to perform an appropriate process according to the Web client in question.

In the present embodiment, if the Web client accesses the box function, the box number corresponding to this Web client is set as the cookie.

Next, an operation in a case where a user depresses a box button 303 by using the Web browser will be explained.

Figures 8, 9:
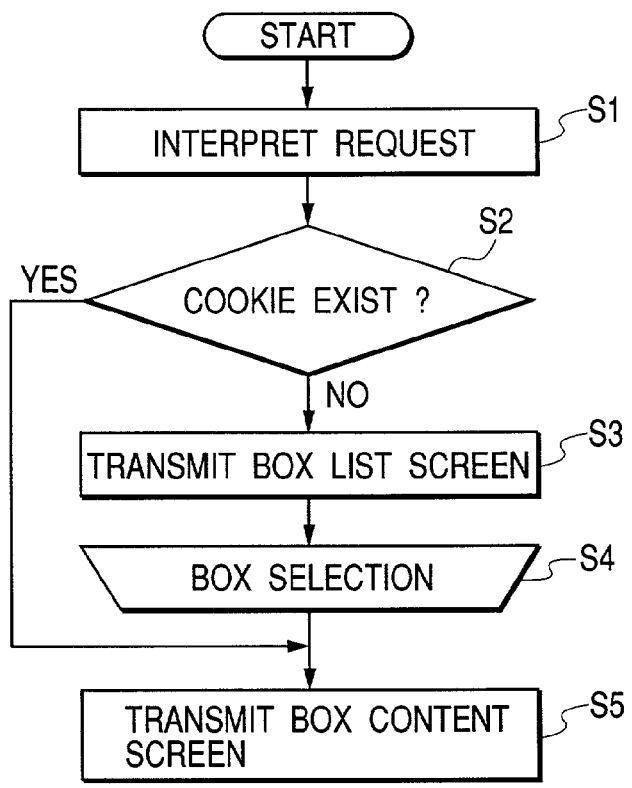
FIG. 8 is a flow chart showing an operation in a case where a user depresses a box button.
FIG. 9 is a diagram showing a client ID (identification) administration table according to the second embodiment.

FIG. 8 is a flow chart showing an operation of the image processing apparatus 101 in the case where the user depresses the box button 303 (i.e., the user clicks a pointing device) on the screen of the remote UI displayed according to the Web browser.

Figure 6:
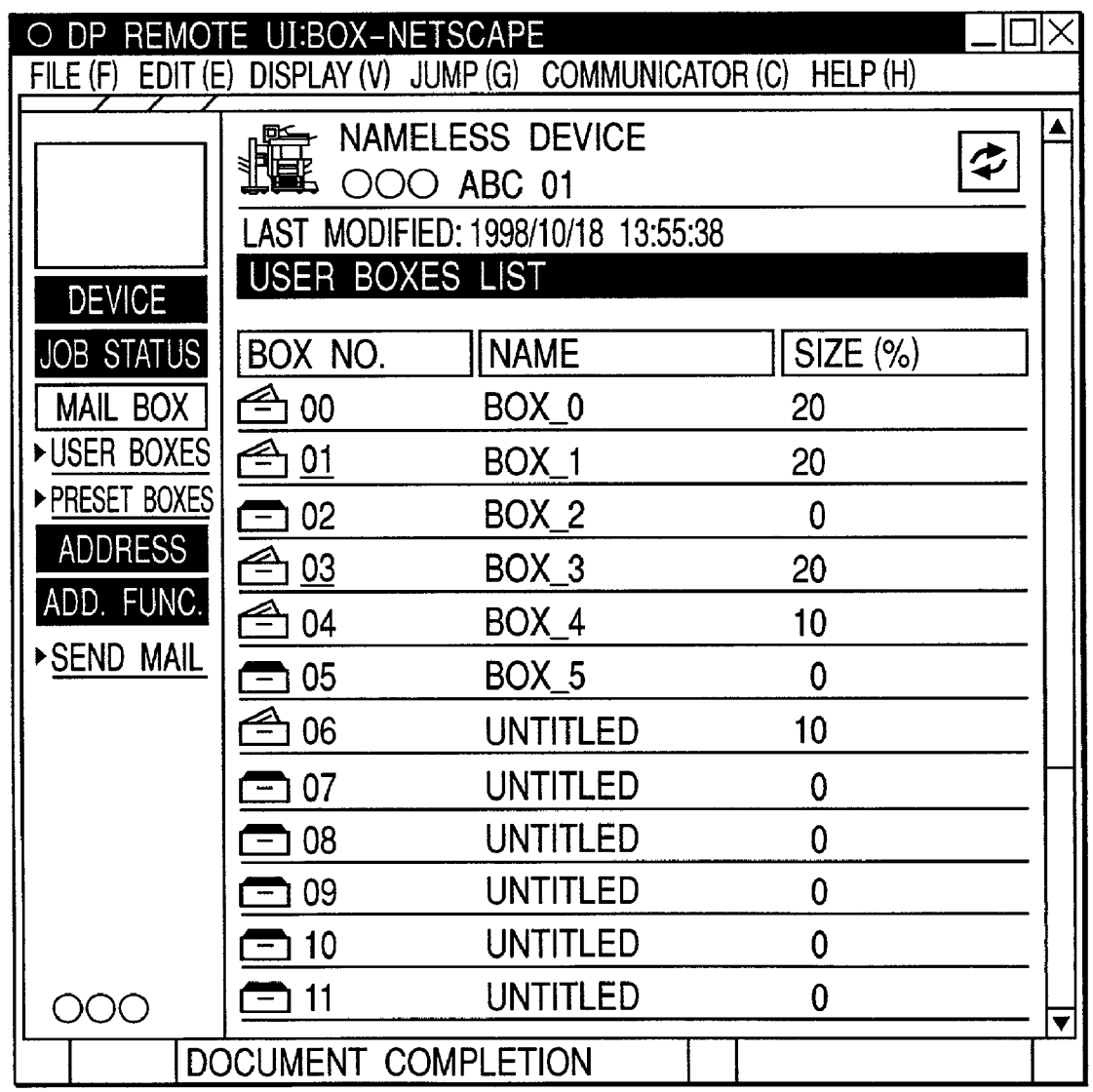
FIG. 6 is an illustration showing a box list display screen.

FIG. 6 is an illustration showing a box list display screen on the remote UI (i.e., the access to the image processing apparatus 101 by the Web client on the network).

In a step S1, the request issued and sent from the Web client with use of the Web browser is received, and the content of the request is interpreted or checked. In a step S2, it is judged whether or not the cookie to designate the box number is included in the request. If judged that the cookie to designate the box number is not included in the request, since it can be considered that the Web client in question operates the box for the first time, the file to display the screen showing a box list (i.e., the screen shown in FIG. 6) is transmitted (step S3).

Figure 7:
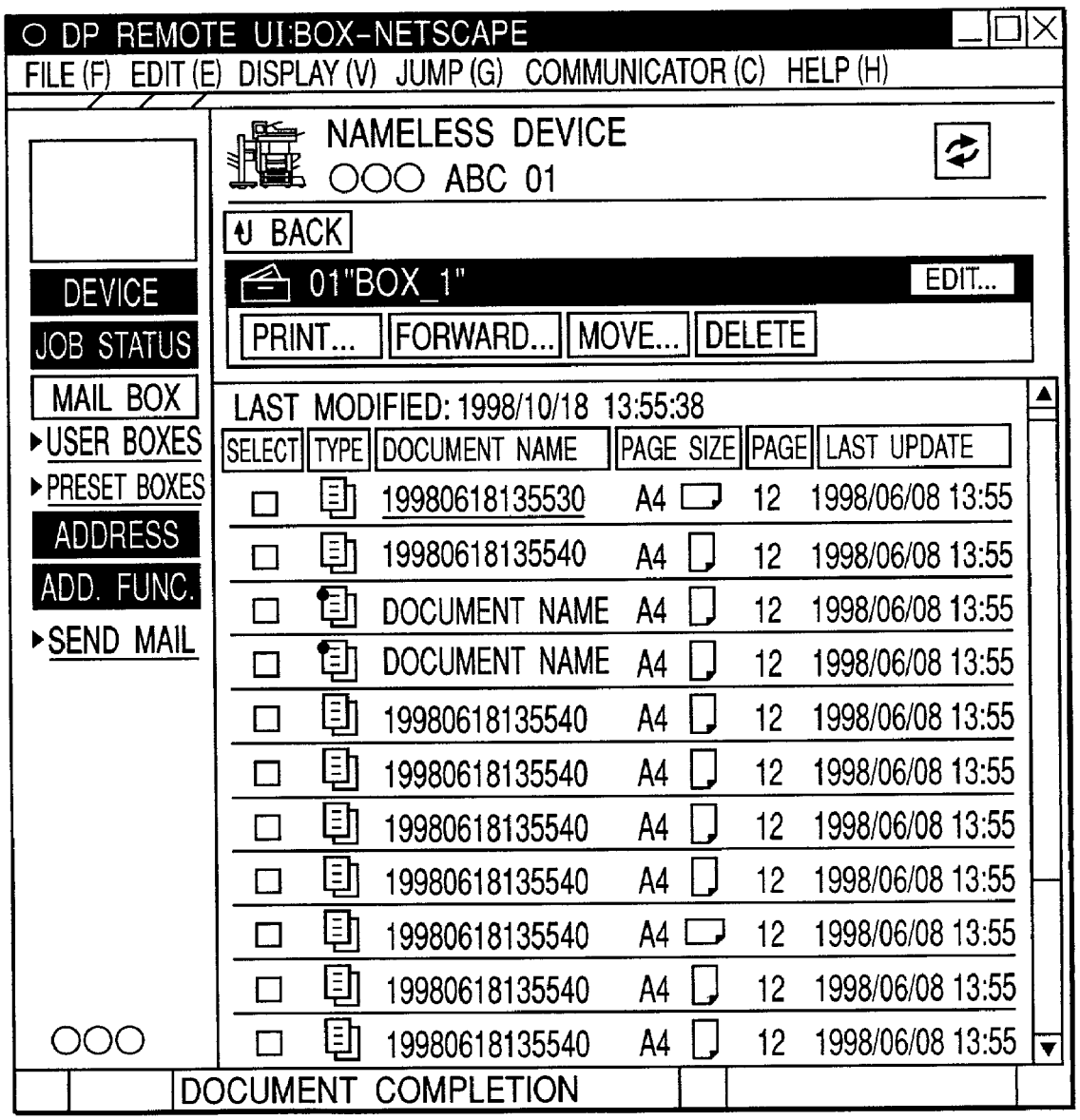
FIG. 7 is an illustration showing a box content display screen.

FIG. 7 is an illustration showing a box content display screen on the remote UI.

If it is recognized that the user selects the one box on the box content display screen (step S4), the information to change the screen to the screen of FIG. 7 showing the contents of the selected box is transmitted (step S5).

On the other hand, if judged in the step S2 that the cookie to designate the box number is included in the request, the screen is changed to that of FIG. 7 without passing the screen of FIG. 6.

When the file representing the screen of FIG. 7 is transmitted to the Web client in the step S5, the box number accessed this time is stored together with the information to discriminate the Web client, and the set-cookie header is also added to the file.

Thus, if a next box information request is issued and sent from the Web client in question, also the cookie to designate the box number is transmitted therefrom. Therefore, in the next access, since it is judged in the step S2 that the cookie exists, the box list is not displayed, but the contents referred at this time are immediately displayed.

Further, although it is assumed that the box number is the box number at the previous-time access in the present embodiment, the present invention is not limited to this. That is, it is needless to say that the box number may be other information. For example, if an address book is used when the transmission function of the image processing apparatus 101 is used, the address book which was referred at the previous time may be first displayed as the address book at this time.

Therefore, in the present embodiment, if the Web client accesses the image processing apparatus through the network, the content to be displayed by the Web browser of this client changes according to the content which was accessed by this client at the previous time, whereby the screen where possibility that each user uses it is high can be preferentially displayed for this user, and operability for the user thus increases.

Second Embodiment

Next, the second embodiment of the present invention will be explained.

Here, it should be noted that, in the present embodiment, the structures of the image processing apparatus 101 and the system are the same as those shown in FIGS. 1 to 4, and also the screens displayed on the remote UI are the same as those shown in FIGS. 5 to 7.

In the image processing apparatus according to the present embodiment of the present invention, an ID to discriminate a Web client is used as a cookie.

FIG. 9 is a diagram showing a client ID administration table 700 used in the present embodiment.

The image processing apparatus which is used in the present embodiment is the apparatus which has the client ID administration table 700 in a nonvolatile memory such as the HDD 2004 or the like.

The client ID administration table 700 includes sections 701, 702 and 703. In the table 700, ID numbers each uniquely indicating a Web client are stored in the section 701, box numbers last accessed by the respective Web clients are stored in the section 702, and address book numbers last accessed by the respective Web clients are stored in the second 703. The client ID administration table 700 is referred and changed every time the Web client accesses it.

Incidentally, in the address book according to the present embodiment, plural addresses (e.g., a facsimile address, an electronic mail address, FTP (file transfer protocol), etc.) can be set for a specific person, and it is assumed that such the specific person is selected on the basis of the address book number. Of course, it is needless to say that an individual address may be selected on the basis of the address book number.

Next, an operation in a case where the Web client accesses the image processing apparatus 101 in the present embodiment will be explained.

FIG. 10 is a flow chart showing the operation in the case where the Web client accesses the image processing apparatus by using Web browser, according to the present embodiment.

In a step S11, a request issued and sent from the Web client by using the Web browser is received, and the content of the request is interpreted or checked. In a step S12, it is judged whether or not a cookie indicating a client ID is included in the request. If judged that the cookie indicating the client ID is not included in the request, the client server unit generates a client discrimination ID which is unique to the Web client in question and sets this ID as the cookie (step S13). Here, to generate the client discrimination ID unique to the Web client in question, for example, it only has to use a time when an ID generation process of this client is performed. Then, a response is transmitted together with a set-cookie header for designating the client ID of the Web client in question (step S14). If a request is issued and sent from this client next time, such a client ID designation cookie is sent from this client together with the request.

On the other hand, if judged in the step S12 that the cookie indicating the client ID is included in the request, a client ID corresponding to the Web client in question is searched in the client ID administration table 700 (step S15). Since the box number and the address book number which were handled by the Web client in question in the previous access have been stored in the client ID administration table 700, a process is performed and a response is transmitted on the basis of such information stored in this table (step S16).

If the sections 702 and 703 are blank, it represents that any operation concerning the box and the address book has not been performed before then by the Web client in question. In this case, a process is performed on the basis of the information representing that this client accesses the image processing apparatus 101 for the first time.

Then, in a step S17, the client ID administration table 700 is updated in accordance with the content of this-time access.

Thus, it is possible to immediately display the screen of the box and the address which are predicted, with high possibility, to be used again according to the past access content of the Web client which accessed the image processing apparatus 101.

It should be noted that each of the box numbers and each of the address book numbers to be stored for each Web client are not limited to one respectively. That is, it is possible to previously store plural kinds of box numbers and plural kinds of address book numbers, and then sequentially display these numbers from the new one to the old one in response to, e.g., selection by a button such as a "next" button or the like. In this case, the number of the box numbers and the number of the address book numbers to be stored for each Web client are previously set respectively, and these numbers are updated one by one from the old one. Of course, if it is considered that the box ordinarily used by the Web client is only one and the address book is often sent to this client itself, it is sufficient that only one box and only one address book are stored. However, it is possible that the plural boxes and address books are used. Thus, a further effect can be expected by storing the plural boxes and address books in the manner as above.

Further, in the present embodiment, the box and the address book which were accessed last time are stored. However, it is possible to store other various kinds of information and change the response according to the stored contents.

Third Embodiment

Next, the third embodiment of the present invention will be explained.

Here, it should be noted that, in the present embodiment, the structures of the image processing apparatus 101 and the system are the same as those shown in FIGS. 1 to 4, and also the screens displayed on the remote UI are the same as those shown in FIGS. 5 to 7.

In the image processing apparatus 101 according to the present embodiment of the present invention, a function to permit each Web client which accessed this apparatus to use this apparatus is limited.

The image processing apparatus in the present embodiment includes a client ID administration table as shown in FIG. 11 in a nonvolatile memory such as the HDD 2004 or the like. This client ID administration table includes sections 1101, 1102, 1103, 1104, 1105 and 1106. In this table, ID's each uniquely indicating a Web client are stored in the section 1101, user names are set in the section 1102, and authorities (or powers) of Web clients are shown in the section 1103. For example, the authorities include "registration waiting", "print permission", "print inhibition", "administrator", and the like. Besides, the limited number of output faces (simply described "limited number of faces" in FIG. 11) of each of the listed Web clients is set in the section 1104, the number of print faces (simply described "output number of faces" in FIG. 11) to be output in response to the instruction from each of the listed Web clients is stored in the section 1105, and a flag indicating whether or not a color output instruction from each of the listed Web clients should be permitted (simply described "color output" in FIG. 11) is set in the section 1106.

Here, it should be noted that the number of output faces (or the number of print faces) represents the number of output operations (or the number of print operations) to be performed to the one face of a recording sheet. That is, the number of output faces (or the number of print faces) may be considered as the number of pages. For example, if the data is printed on the two (front and back) faces of the one recording sheet, the number of output faces (or the number of print faces) is "2".

Next, an operation in a case where the Web client accesses the image processing apparatus 101 in the present embodiment will be explained.

Figure 12:
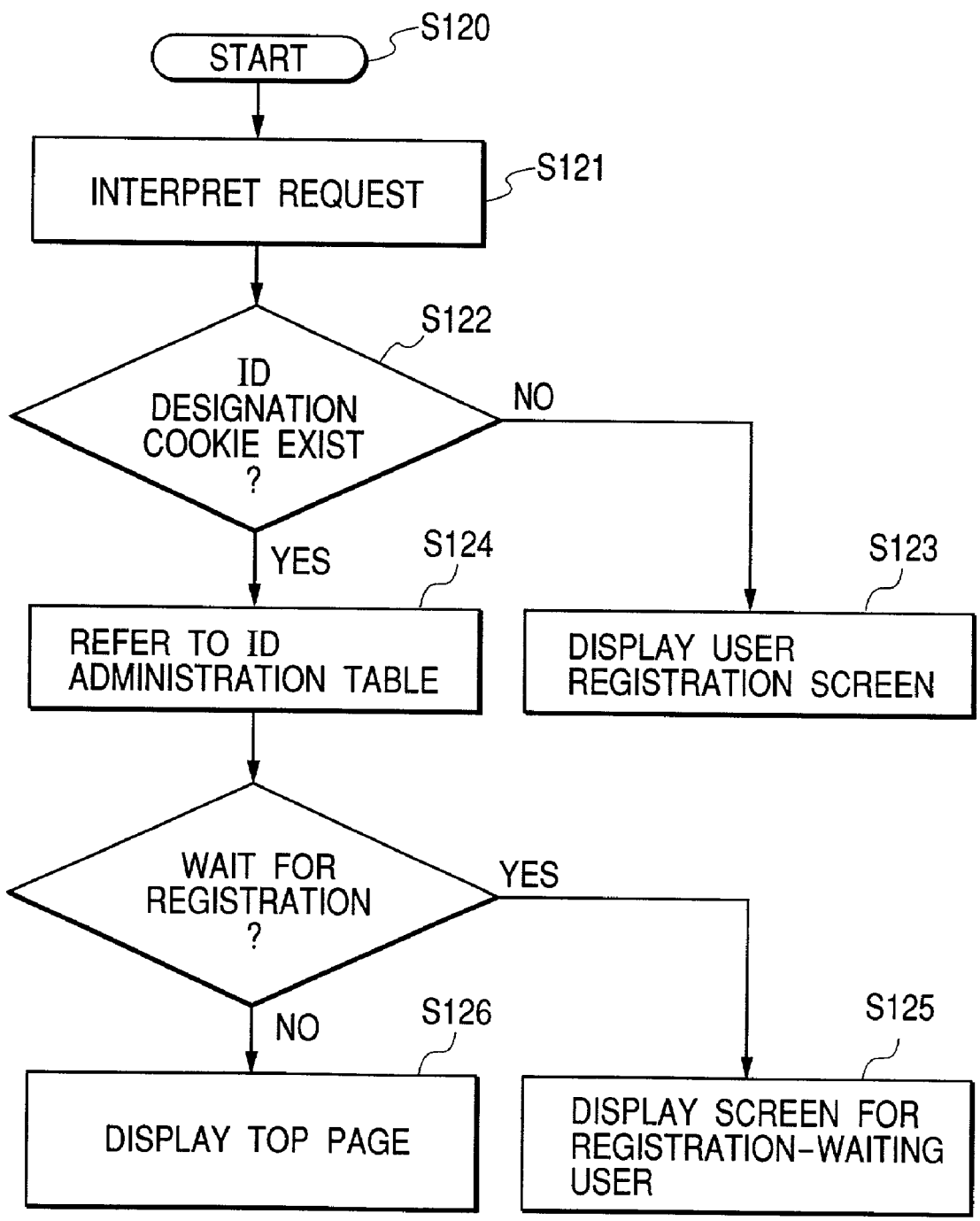
FIG. 12 is a flow chart showing an operation in a case where a Web client accesses an image processing apparatus by using Web browser, in the third embodiment.

FIG. 12 is a flow chart showing the operation in the case where the Web client accesses the image processing apparatus 101 by using Web browser, according to the present embodiment.

Figure 13:
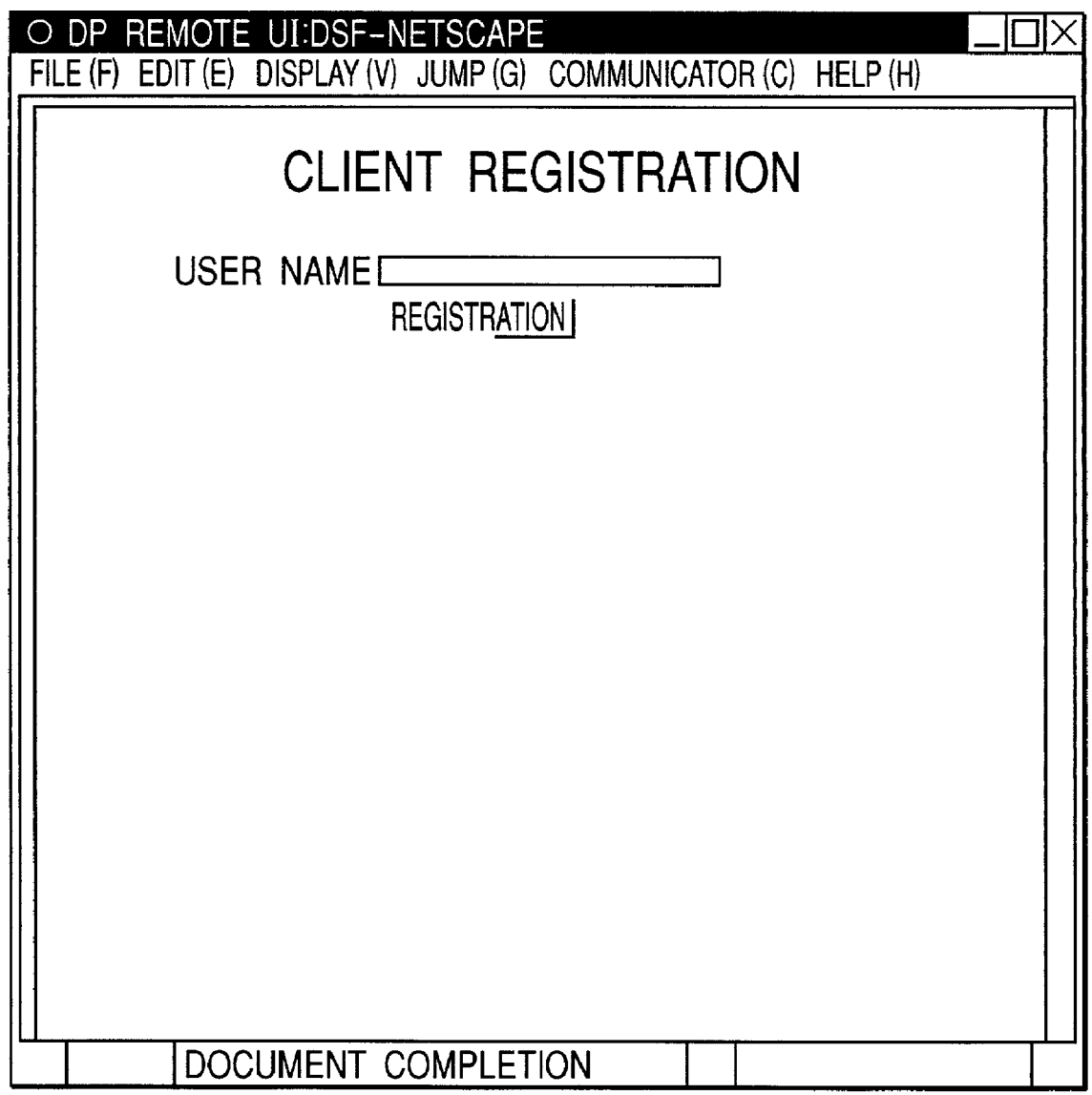
FIG. 13 is an illustration showing a client registration screen displayed in a case where a Web client not registered in the client ID administration table accesses the image processing apparatus in the third embodiment.

If the operation starts in a step S120, a request issued and sent from the Web client with use of the Web browser is received and the content thereof is interpreted in a step S121. In a step S122, it is judged whether or not a cookie indicating a client ID is included in the request. If judged that the cookie indicating the client ID is not included in the request, it is considered that there is first access from the Web client in question, and thus a user registration screen as shown in FIG. 13 is displayed (step S123).

Figure 14:
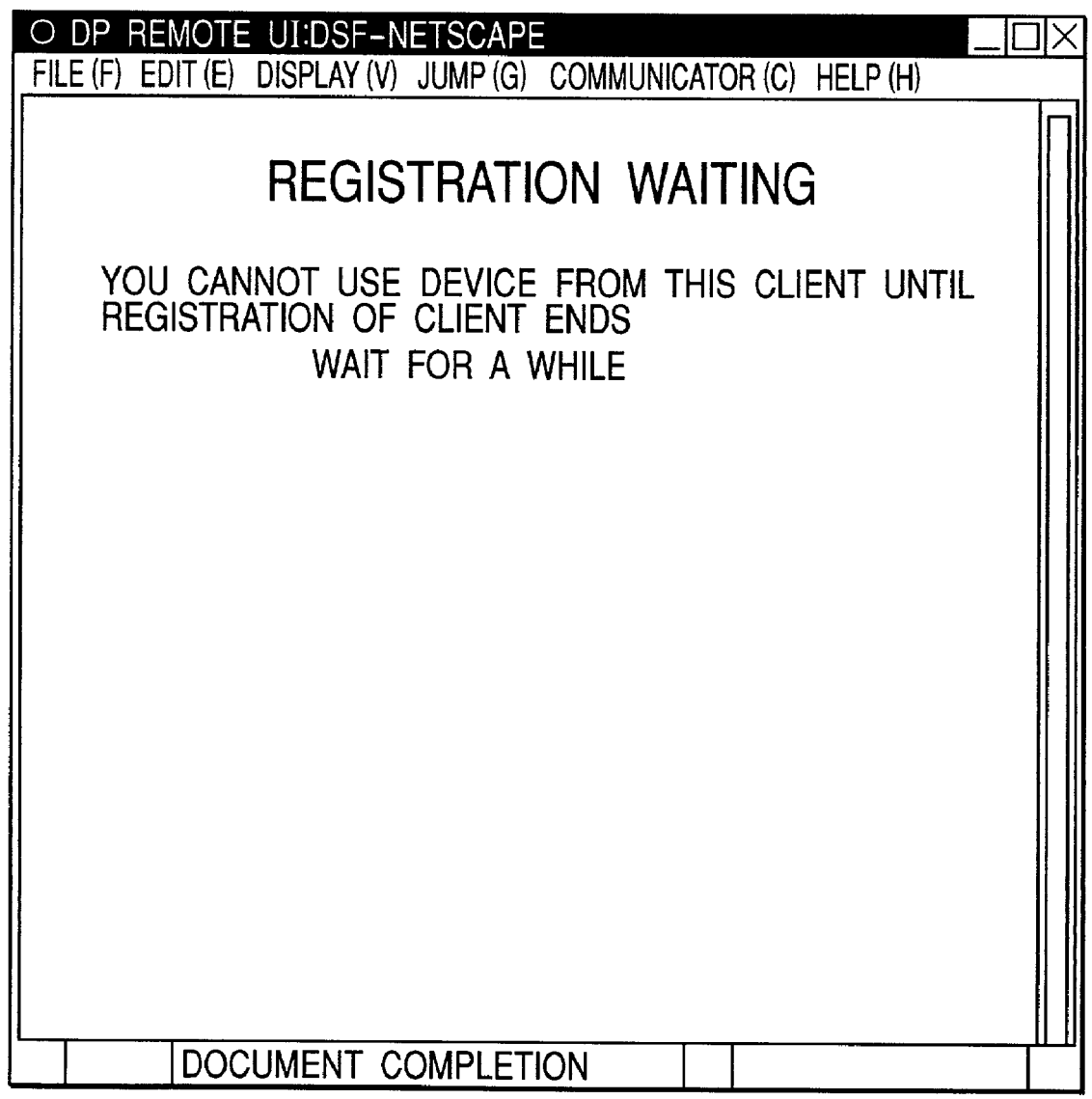
FIG. 14 is an illustration showing a screen displayed in a case where a Web client of authority "registration waiting" in the client ID administration table accesses the image processing apparatus in the third embodiment.

If a user at the Web client inputs necessary matters and then depresses a "registration" button, the input information is sent to the image processing apparatus 101. The sent information is received by the image processing apparatus 101, a unique client discrimination ID for this client is generated, and this client is registered in the client ID administration table. When the Web client is registered, the authority section 1103 is set to "registration waiting". Then, the data representing the screen shown in FIG. 14 is transmitted to the Web client together with a set-cookie header for setting the generated discrimination ID as a cookie. Thus, after then, when the image processing apparatus 101 is accessed from the Web client in question, this discrimination ID is sent therefrom together. Although only a user name is registered to the section 1102 in the present embodiment, other user information may be input.

On the other hand, if judged in the step S122 that the cookie indicating the client ID is included in the request, the information registered for the Web client in question is searched in the client ID administration table and read therefrom (step S124).

Then, the section of authority in the client ID administration table is referred. If the authority of the Web client is "registration waiting" (i.e., this client waits for registration), the screen shown in FIG. 14 is transmitted to this client (step S125). Therefore, it should be noted that a Web client which is not registered can not operate this image processing apparatus. That is, if the Web client which accessed the image processing apparatus is not the Web client of "registration waiting", the top page same as that shown in FIG. 5 is displayed (step S126).

However, in the present embodiment, only when the Web client which accessed the image processing apparatus is the Web client of which the authority in the client ID administration table is "administrator", a button 304 (FIG. 5) to perform user administration is displayed. That is, even if the Web client which accessed the image processing apparatus is not the Web client of which the authority is "administrator", the button 304 is not displayed.

If the button 304 provided only for the administrator is depressed, the screen shown in FIG. 15 is displayed on the Web client in question. On this screen, the contents of the client ID administration table can be referred and changed. If the limited number of output faces, the flag indicating whether or not the color output instruction should be permitted, and the authority are set by the administrator for the Web client which is newly registered and in the sate of "registration waiting", the operation becomes possible from the Web client to which the authority has been set. Besides, for example, if a user with bad manners accesses the image processing apparatus, it is possible to set the authority "print inhibition" so that this user can not output the data. Moreover, it is possible to temporarily set the authority "print inhibition" for all the users for the purpose of maintenance of the image processing apparatus.

Figure 16:
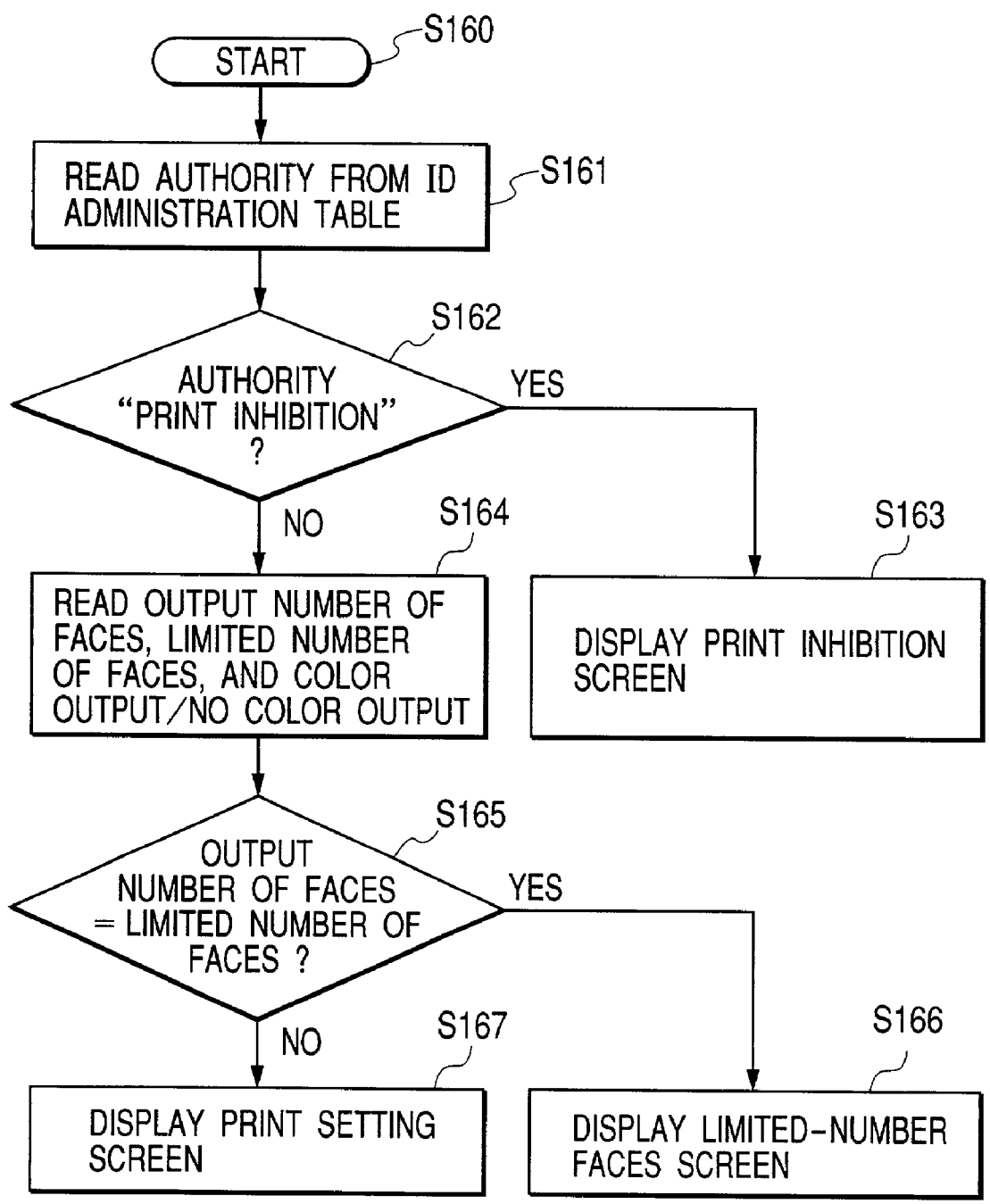
FIG. 16 is a flow chart showing an operation in a case where an instruction to print a document in a box is issued and sent from a Web client, in the second embodiment.
Figure 17:
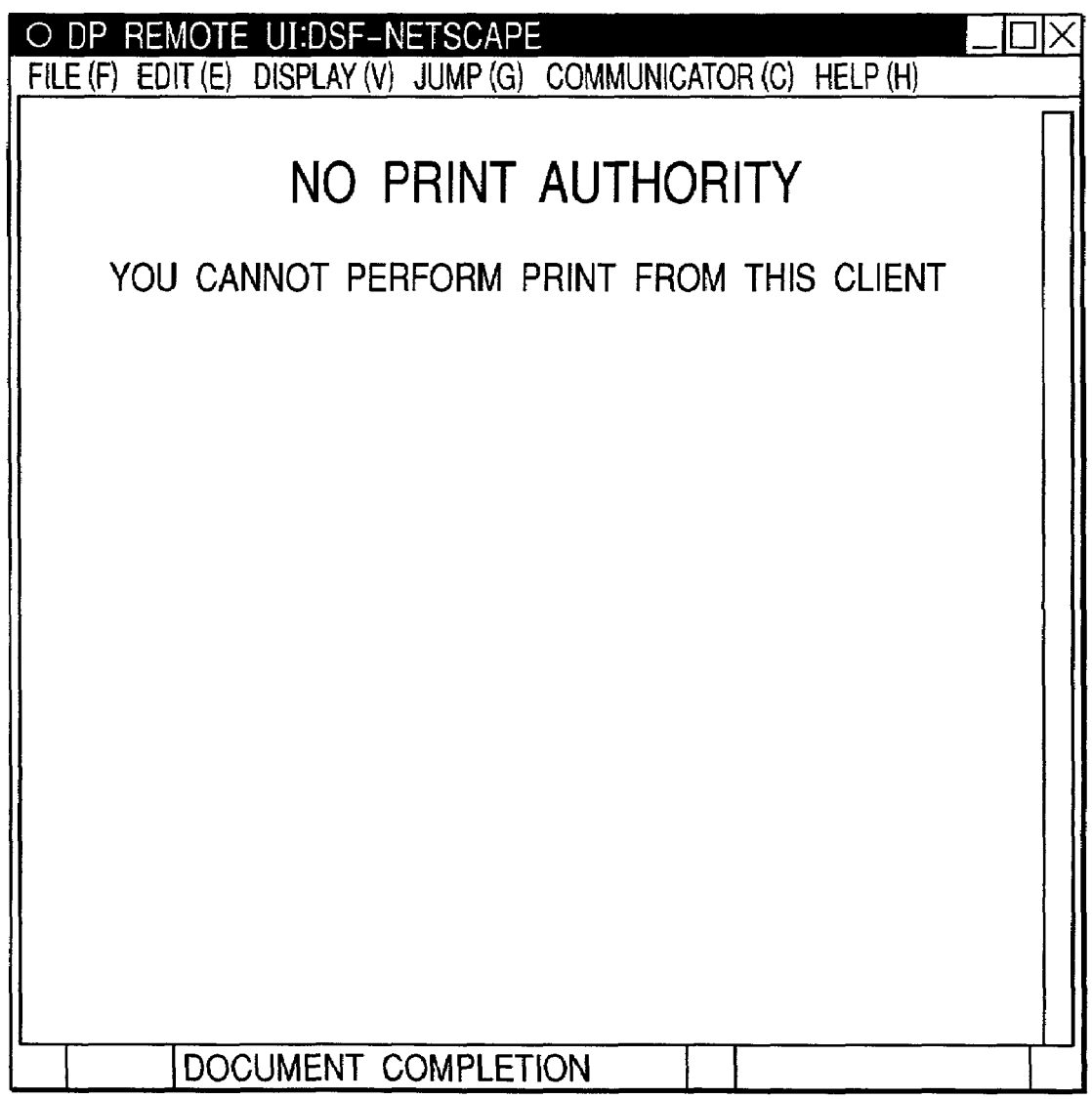
FIG. 17 is an illustration showing a screen displayed in a case where an instruction to print the document in the box is issued and sent from a Web client of authority "print inhibition" in the client ID administration table, in the third embodiment.

Next, an operation in a case where the Web client accesses and instructs the printer to print the document in the box will be explained with reference to FIG. 16. First, the operation starts in a step S160, and the information concerning the Web client is read from the client ID administration table in a step S161. Then, it is judged in a step S162 whether or not the authority of the Web client in question is "print inhibition". If judged that the request to print the document is sent from the Web client of which the authority is "print inhibition", the screen shown in FIG. 17 is displayed on the Web client in question (step S163). Therefore, it is impossible for the Web client of which the authority is "print inhibition" to issue and send the print instruction.

Figure 18:
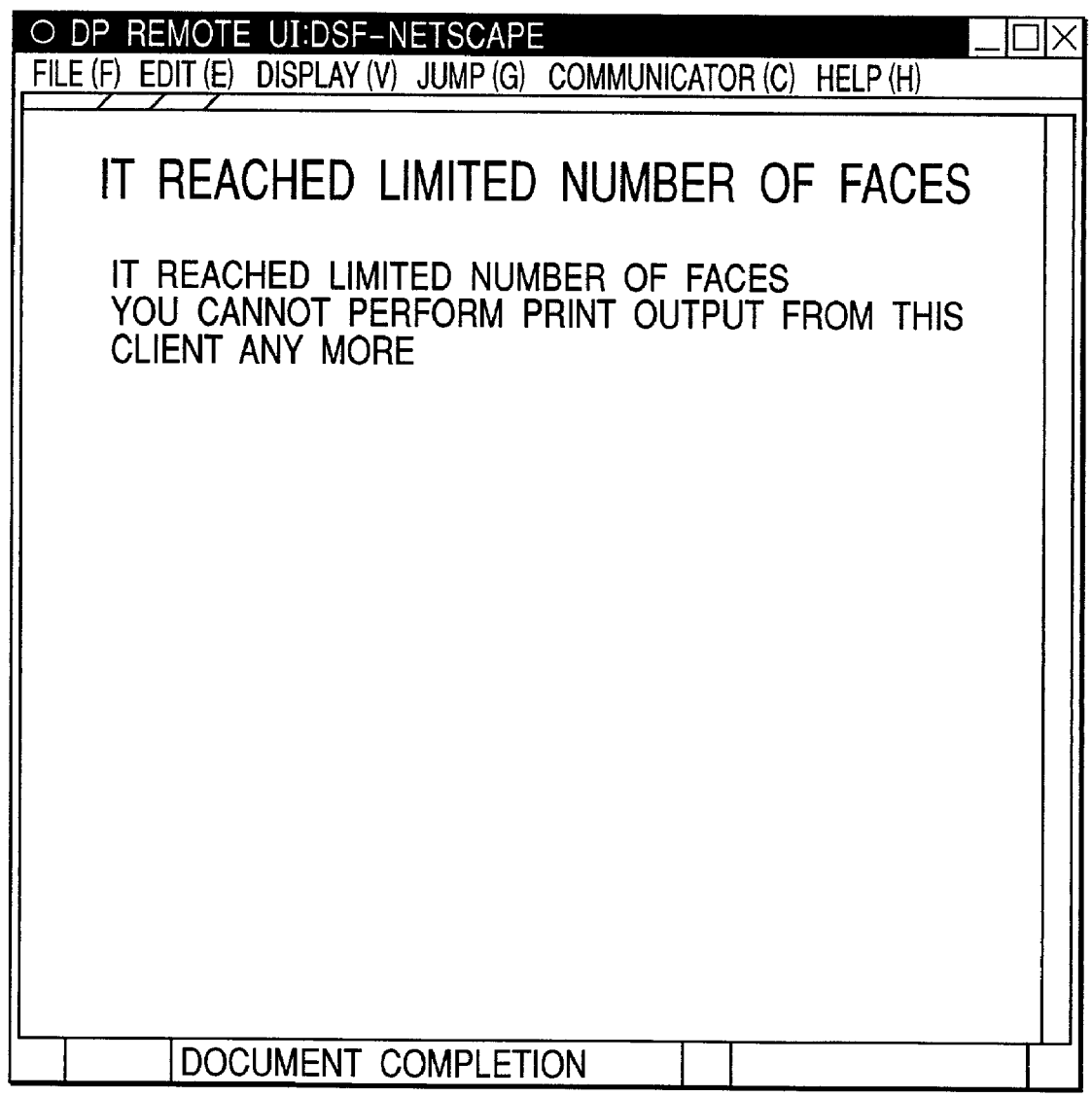
FIG. 18 is an illustration showing a screen displayed in a case where an instruction to print the document in the box is issued and sent from a Web client for which the output number of faces reached the limited number of faces, in the third embodiment.

On the other hand, if judged in the step S162 that the instruction to print the document is sent from the Web client which is not the Web client of the authority "print inhibition", the information is read from the sections "output number of faces", "limited number of faces" and "color output" of the Web client in question on the client ID administration table (step S164). Then, it is judged in a step S165 whether or not the output number of copies (i.e., the output number of faces) has reached the limited number of faces. If judged that the output number of copies has reached the limited number of faces, the screen shown in FIG. 18 is displayed (step S166). Therefore, it is impossible for the Web client of which the output number of copies has reached the limited number of faces to issue the print instruction any more.

On the other hand, if judged in the step S165 that the output number of copies does not reach the limited number of faces, a print setting screen of FIG. 19 is displayed (step S167). However, even in this case, if such the access is issued and sent from the Web client for which color outputting is not permitted, then a screen on which there is no color output instruction section 191 (FIG. 19) is displayed. Therefore, it is impossible for the Web client for which the color outputting is not permitted to issue the color output instruction. Further, it is assumed that the upper limit value of a range 192 (FIG. 19) wherein the number of prints can be set is given by subtracting the output number of faces from the remaining number of copies capable of being output from the Web client in question, i.e., the limited number of faces. For example, if the Web client for which the limited number of faces "500" and the output number of faces "300" are given on the client ID administration table accesses, the range wherein the number of prints can be set is set to "1 to 200".

As above, since the setting screen which is displayed on the side of the Web client changes, the color outputting can not be instructed from the Web client for which the color outputting is not permitted, and the outputting of the number of copies exceeding the limited number of faces for the Web client can not be performed by this client.

It should be noted that the limited items in the present embodiment are not limited to the above, that is, sizes of usable recording sheets, use of postprocesses such as stapling and the like may be included in the limited items. Moreover, the limited number of faces may be set for each size, color/mono-chrome, and the like.

As described above, according to the present embodiment, the user administration function and the print function can be limited for each Web client.

Further, the limited contents may be directed only to the printing but also to destinations (a facsimile address, an electronic mail address, FTP, etc.) in a transmission function.

According to the embodiments as described above, in the case where the respective functions of the image processing apparatus 101 are used from the Web clients on the network, it is possible to increase operability and simplify user administration by making the screen to be displayed different and by limiting the function for each Web client.

It should be noted that the operations of the above embodiments can be achieved by software other than the Web browser (e.g., application software dedicated for the image processing apparatus 101, and other applications). However, by using the Web browser capable of displaying an ordinary home page as in the above embodiments, the remarkable effect can be achieved because the design of the application on the side of the Web clients is omissible.

In any case, although the present invention was explained independently on the basis of each of the above three embodiments, it is needless to say that the operations of all the embodiments can be performed at the same time.

As above, the present invention was explained on the basis of the preferable embodiments. However, the present invention is not limited to these embodiments, but may be modified in various manners within the scope of the following claims.

What is claimed is:

1. A computer readable-medium storing a program for controlling an image processing apparatus which processes image data, wherein said program executes a control method comprising:

a connecting step of connecting the image processing apparatus to a network to which plural client terminals are connectable;

an accepting step of accepting a request from one of the plural client terminals connected to the image processing apparatus via the network;

a processing step of performing a process regarding the image data in accordance with the request accepted in said accepting step;

a registering step of registering the content of the process performed in said processing step;

a discriminating step of discriminating, when the request is accepted in said accepting step, whether or not the content of the process according to the request has been registered in a registering unit in said registering step; and a determining step of determining the content of the process in said processing step when the request was accepted in said accepting step in accordance with a discrimination request of said discriminating step, wherein said determining step determines a format of data to create a screen to be displayed on the client terminal in accordance with the request accepted in said accepting step.

2. An image processing apparatus which processes image data, comprising:

a connector, arranged to connect said image processing apparatus to a network to which plural client terminals are connectable;

an acceptor, arranged to accept a request from one of the plural client terminals connected via said connector;

a processor, arranged to perform a process regarding the image data in accordance with the request accepted by said acceptor;

a registering unit, arranged to register the content of the process performed by said processor;

a discriminator, arranged to discriminate, when the request is accepted by said acceptor, whether or not the content of the process according to the request has been registered in said registering unit; and a determinator, arranged to determine the content of the process by said processor when the request is accepted by said acceptor in accordance with a discrimination request by said discriminator;

wherein said determinator determines a format of data to create a screen to be displayed on the client terminal in accordance with the request accepted by said acceptor.

3. An apparatus according to claim 2, wherein the screen is to display information regarding the image data for the client terminal which sent the request accepted by said acceptor.

4. An apparatus according to claim 2, wherein the screen is to select a destination necessary to transmit the image data.

5. An apparatus according to claim 2, further comprising a sending unit, arranged to send the registered content to the client terminal which sent the request, when the content of the process is registered by said registering unit.

6. An apparatus according to claim 2, wherein said processor generates a Web page according to the request accepted by said acceptor.

7. An apparatus according to claim 2, further comprising an outputter, arranged to output the image data, wherein said determinator limits a function regarding said outputter in accordance with the client terminal which sent the request accepted by said acceptor.

8. An apparatus according to claim 7, wherein said outputter prints an image on a recording sheet on the basis of the image data, and said determinator limits the number of faces of the recording sheet to which the printing by said outputter is permitted discriminatingly for each client terminal.

9. A control method of an image processing apparatus which processes image data, said method comprising:

a connecting step of connecting the image processing apparatus to a network to which plural client terminals are connectable;

an accepting step of accepting a request from one of the plural client terminals connected to the image processing apparatus via the network;

a processing step of performing a process regarding the image data in accordance with the request accepted in said accepting step;

a registering step of registering the content of the process performed in said processing step;

a discriminating step of discriminating, when the request is accepted in said accepting step, whether or not the content of the process according to the request has been registered in a registering unit in said registering step; and a determining step of determining the content of the process in said processing step when the request was accepted in said accepting step in accordance with a discrimination request of said discriminating step, wherein said determining step determines a format of data to create a screen to be displayed on the client terminal in accordance with the request accepted in said accepting step.

\* \* \* \* \*

UNITED STATES PATENT AND TRADEMARK OFFICE
CERTIFICATE OF CORRECTION

PATENT NO. : 7,265,859 B2 Page 1 of 1
APPLICATION NO. : 10/059146
DATED : September 4, 2007
INVENTOR(S) : Tomoya Sato It is certified that error appears in the above-identified patent and that said Letters Patent is hereby corrected as shown below:

COLUMN 1:
Line 39, "it" should read --there--; and
Line 64, "such the" should read --such--.

COLUMN 3:
Line 35, "transmit" should read --transmits--; and
Line 36, "receive (or accept)" should read --receives (or accepts)--; and
Line 59, "control" should read --controls--.

COLUMN 7:
Line 27, "analyze" should read --analyzes--.

COLUMN 12:
Line 13, "sate" should read --state--.

COLUMN 13:
Line 50, "computer readable-medium" should read --computer-readable medium--.

Signed and Sealed this

Sixth Day of May, 2008

JON W. DUDAS
*Director of the United States Patent and Trademark Office*